UNITED STATES PATENT OFFICE.

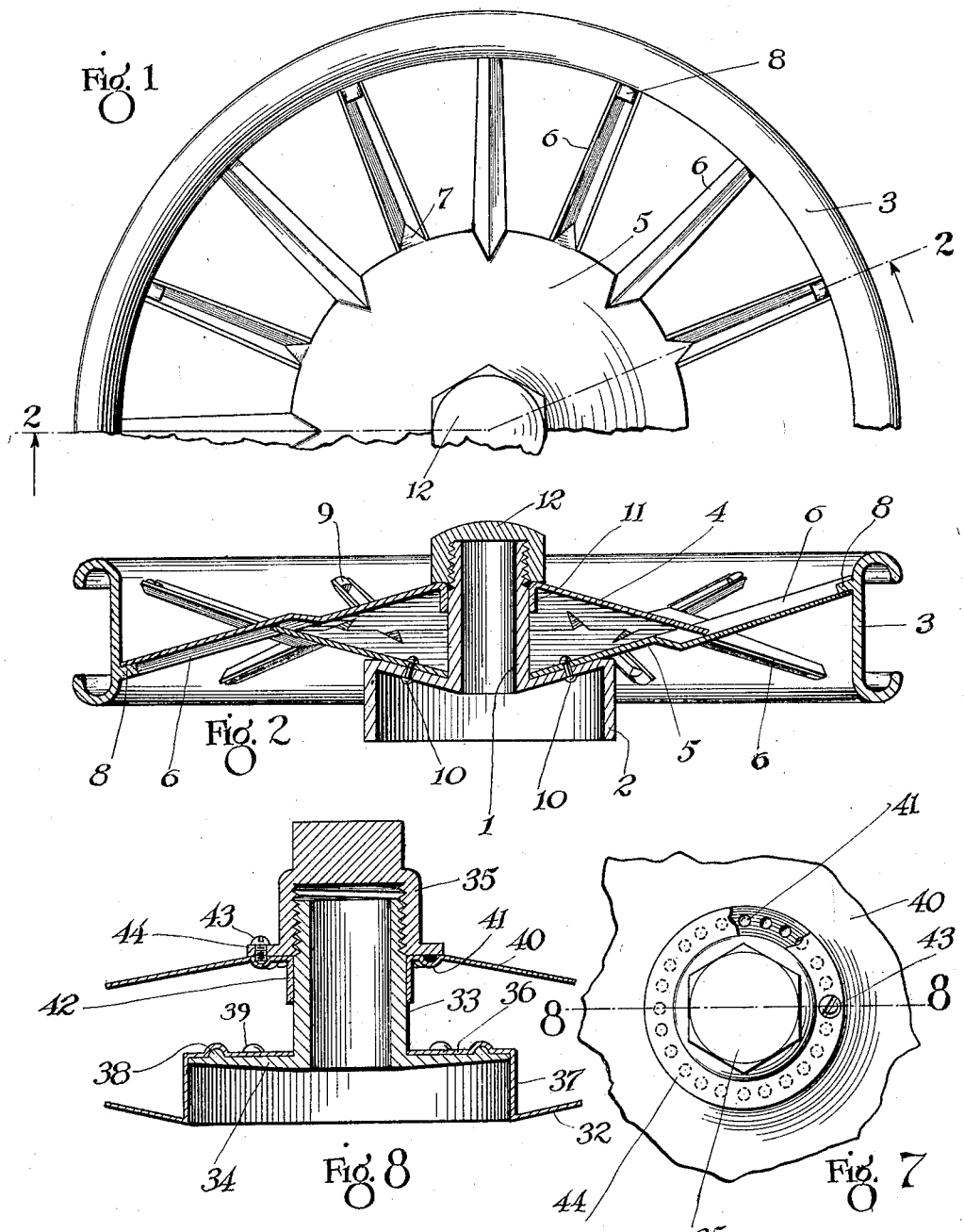

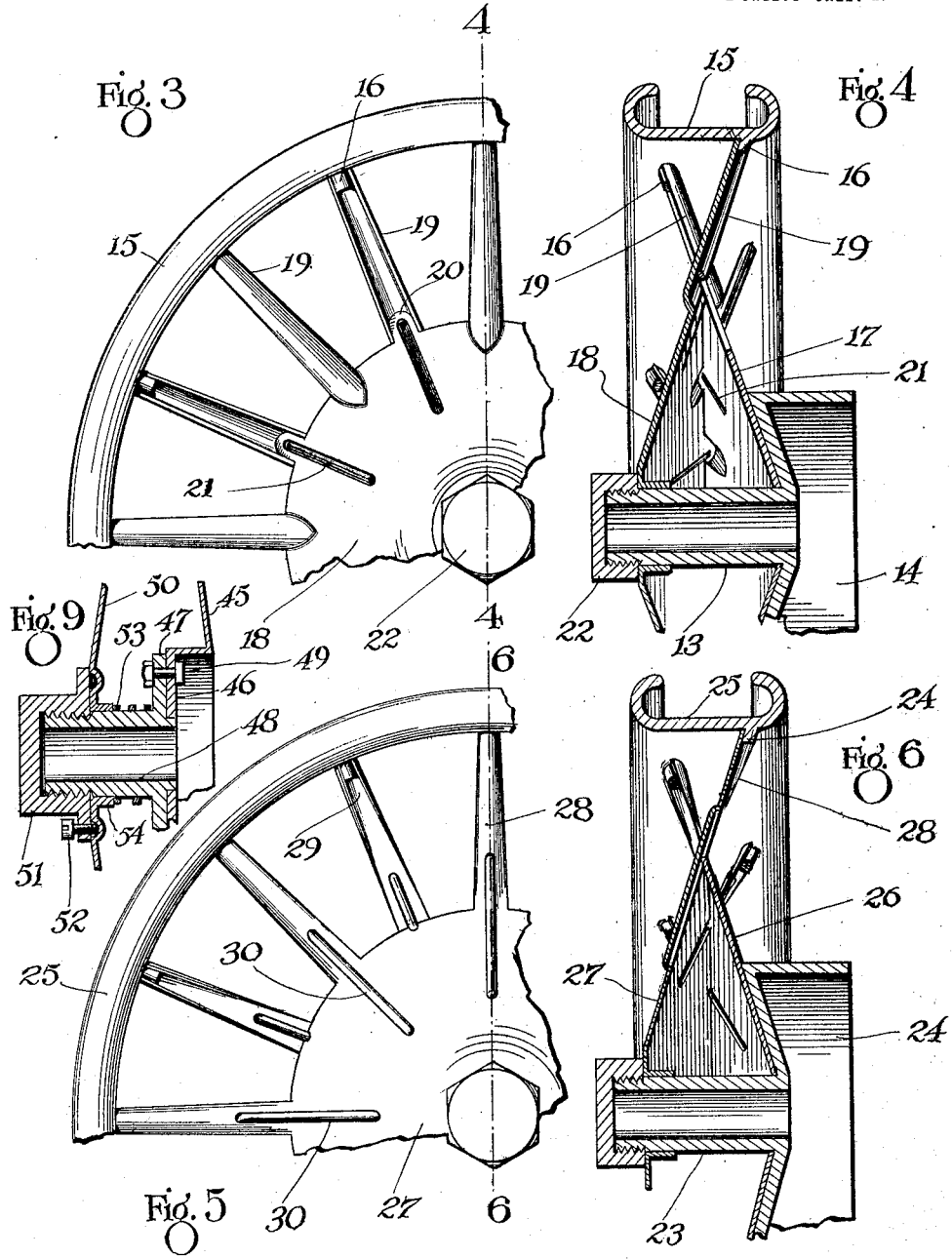

HENRI DANIEL REY, OF AVARUA, RARATONGA, NEW ZEALAND.

WHEEL.

1,387,179.   Specification of Letters Patent.   Patented Aug. 9, 1921.

Application filed February 7, 1920. Serial No. 356,856.

*To all whom it may concern:*

Be it known that I, HENRI DANIEL REY, a citizen of the Republic of France, and a resident of Avarua, Island of Raratonga, one of the Cook Islands, within the boundaries of New Zealand, have invented certain new and useful Improvements in Wheels, of which the following is a specification.

My invention is an improvement in wheels, and has for its object to provide a wheel adapted for use in any connection, composed of a hub, a rim and a spoke portion which consists of two sections formed from sheet steel or the like, pressed or stamped to shape and adapted to be fitted on the hub and to engage the rim, and to cross each other between the hub and the rim, and to be pressed together to firmly engage the hub and the rim and to support the hub from the rim.

In the drawings:

Figure 1 is a side view of a portion of the improved wheel,

Fig. 2 is a section on the line 2—2 of Fig. 1,

Fig. 3 is a side view of a part of a modified construction of wheel,

Fig. 4 is a section on the line 4—4 of Fig. 3,

Fig. 5 is a sectional view showing another modification,

Fig. 6 is a section on the line 6—6 of Fig. 5,

Fig. 7 is a view looking at the hub showing a locking construction for the cap nut, Fig. 8 is a section on the line 8—8 of Fig. 7.

Fig. 9 is a view similar to Fig. 8 showing another embodiment of the invention.

In the embodiment of the invention shown in Figs. 1 and 2, the improved wheel is composed of a hub 1 having at one end a brake drum 2, a rim 3, and a spoke portion arranged between the hub and the rim, and which is composed of sections 4 and 5. These sections are concave or conical and are formed from sheet steel or like material pressed or stamped to shape, each consisting of a central solid portion having radial extensions, and preferably the extensions, indicated at 6, are bent angularly as clearly shown in Figs. 1 and 2, for the sake of strength.

Each spoke section may have as many radial extensions as may be necessary, and between each pair of radial extensions the central portion of each spoke section has a radial lug 7 of substantially triangular shape which is adapted to engage within the bend of an extension of the other section. The outer ends of the radial extensions engage lugs 8 which extend inwardly from the rim, a series of lugs 8 being provided at each side of the rim, and the lugs of the series are staggered.

The spacing of the extensions and of the lugs 7 is the same in the two sections of the spoke portion, and the central portion of one of the sections, 5 in the present instance, abuts the inner face of the brake drum 2, and it will be noticed that the said inner face of the drum is concaved to fit the contour of the section 5 when in place, and the section is secured to the drum by means of rivets 10 or the like. The section 4 at the opening for the hub has an inwardly extending flange or rib 11 which fits about the hub, and this end of the hub is engaged by a cap nut 12 threaded onto the hub for holding the spoke sections in place.

In building this wheel, the section 5 is placed on the hub and secured to the brake drum. The extensions 6 of the section 5 are engaged with the lugs 8 at the opposite side of the rim from the brake drum. The section 4 is now slipped on the hub, the cap nut being removed, and the extensions 6 of this section are engaged with the lugs 8 at the side of the rim adjacent to the brake drum, and with the lugs 7 of the two sections fitting within the extensions of the other section.

When now the cap nut is screwed in place the sections 4 and 5 will be forced toward each other and since the extensions 6 are engaged with the lugs 8, the sections will tend to flatten and to increase in aggregate radial diameter, thus firmly supporting the hub from the rim. While sufficiently rigid, the improved wheel is flexible and elastic. It is easily assembled and disassembled when necessary, and any looseness may be taken up by turning the cap nut in the proper direction.

The embodiment of the invention shown in Figs. 3 and 4 is especially adapted for heavy vehicles, as for instance, trucks. In this construction, the hub 13 carries the brake drum 14, and the rim 15 has an inwardly extending series of radial lugs 16 corresponding to the lugs 8 of Fig. 1. The spoke portion is composed of sections 17 and 18, each section having radial extensions 19, which instead of having their sides meeting at an angle, are curved or arc-shaped in cross section. Each section has the radial lugs 20 between the extensions corresponding to the lugs 7, and engaging within the extensions of the other hub portion.

In this construction, the solid portion of each spoke section is slotted radially at each lug 20, as indicated at 21, the slots extending into the lugs at one end, and being of a length equal to about half the radius of the solid portion of the section. These slots provide resiliency and flexibility, especially in assembling the wheel, and also in use. When the sections 17 and 18 are pressed together by the turning on of the cap nut 22, the slots permit the sections to adapt themselves to the pressure.

In Figs. 5 and 6 the improved wheel is composed of the hub 23 having the brake drum 24 at one end, the rim 25 and the spoke portion consisting of the sections 26—27. Each hub portion has the radial extensions 28 corresponding to the extensions 6 of Fig. 1, and these extensions engage the radial inwardly extending lugs 29 on the rim, arranged in the same manner as the lugs 8 and 16 of Figs. 1 and 3.

These radial extensions are curved or arc-shaped in cross section, and each spoke section is provided at each spoke with a radial bead or rib 30 extending between the extension and the solid portion of the section, and covering a part of the length of the extension, and approximately one-half of the radius of the solid portion. These ribs reinforce the sections against the solid portion of the wheel and considerably strengthen the wheel, making it more rigid at these points.

Each spoke section has the notches corresponding in location to the ribs 30 for receiving within the ribs of the other section. In Figs. 7 and 8, there is shown a modified construction wherein the brake drum is formed in one of the spoke portions, the said portion being indicated at 32 in the present instance. With this arrangement, the hub 33 has a marginal flange 34 at one end, and is engaged by the cap nut 35 at the other, the said nut being screwed onto the hub.

A portion of the spoke section 32 at the center thereof is offset laterally as indicated at 36, and this offset portion is of sufficient diameter to fit that face of the flange 34 adjacent to the cap nut. The connection between the offset portion and the body of the spoke section as indicated at 37, provides the engaging surface of the drum.

In order to prevent angular movement of the spoke portion with respect to the hub, any suitable means may be provided, in the present instance lugs 38 being provided on the flange which engage within depressions 39. In Figs. 7 and 8 there is shown mechanism for locking the cap nut with respect to the hub. Referring to these figures, it will be seen that the section 40 of the spoke portion has an annular series of depressions 41 adjacent to the inwardly extending flange 42 which fits over the hub. A set screw 43 is threaded through a marginal flange 44 on the nut, and this set screw is adapted to engage one of these openings to prevent loosening of the nut.

When it is desired to remove the rim for instance, the cap nut is loosened, the sections of the spoke portion are slightly separated, and by turning the rim angularly with respect to the hub or the hub with respect to the rim, the lugs 8 will be brought out of register with the extensions of the spoke sections, permitting the quick and easy removal of the rim.

In Fig. 9 there is shown another construction, wherein the brake drum is formed in one of the spoke portions, the said portion being indicated at 45. With this arrangement a portion 46 of the spoke section at the center thereof is offset laterally, and this offset portion is secured to the outer face of an annular flange 47 on the hub 48, the offset portion being secured to the flange 47 by means of bolts and nuts 49 or in any other desired manner.

The other spoke section 50 is engaged by the cap nut 51 in the same manner as shown in Fig. 8, and locking mechanism indicated generally at 52 is provided for preventing disengagement of the cap nut. With this arrangement, a spring 53 encircles the hub between the flange 47 and the hub portion 54 of the spoke section 50. This spring acts to force the spoke section 50 away from the cap nut 45, thus facilitating the disassembling of the wheel.

With the construction shown in Fig. 8, when the cap nut is removed, both spoke sections may be removed from the hub without removing the hub from the axle. The construction of Fig. 9 is however, especially adapted for use with existing wheel hubs. The flange 47 is the flange to which the spoke is connected in the usual wheel, and by removing these spokes and placing the spoke section 45 and the spoke section 50, the wheel is converted into a pressed sheet metal wheel without any change in the hub.

It will be understood that in disassembling the wheel, whenever the rim lugs are moved out of register with the extensions of the forward spoke section, that is, the section adjacent to the operator, the rim may be removed.

I claim:

1. In a wheel, a hub and a rim and a body composed of sections, said sections being concave and having their concave faces adjacent, the sections having openings for the hub, the rim having lugs for engagement by the sections to limit their movement through the rim toward each other, and means for forcing the sections together, to flatten the sections to cause them to tightly engage the rim, said sections having interengaging means for preventing relative angular movement of the sections with respect to each other after they are in place on the wheel.

2. In a wheel, a hub and a rim and a body composed of sections, the sections having openings for the hub, the rim having lugs for engagement by the sections to limit their movement through the rim toward each other, and means for forcing the sections together, said sections having interengaging means for preventing relative angular movement of the sections with respect to each other after they are in place on the wheel and engaged by the forcing of the sections toward each other.

3. In a wheel, a hub and a rim, and a body composed of sections, the sections having openings for receiving the hub, one of said sections having a laterally offset portion at its center abutting the wheel flange and secured thereto, and a cap nut threaded onto the other end of the hub and engaging the other section to force said section toward the first named section, the rim and the sections having interengaging means for limiting the movement of the central portions of the sections toward each other, and a spring normally acting to force the last named section from the first named section.

4. In a wheel construction, a hub and a rim, and a body connecting the hub and the rim, said body consisting of concave sections arranged with their concave faces adjacent, the sections and the rim having interengaging means for limiting the movement of the sections toward each other, means in connection with the hub for forcing the central portions of the sections together, and interengaging means in connection with the section and engaged by the movement of the sections toward each other for preventing angular movement of the sections with respect to each other, said means comprising trough shaped extensions and lugs between the extensions for engaging the extensions of the other sections.

5. In a wheel construction, a hub and a rim, and a body connecting the hub and the rim, said body consisting of concave sections arranged with their concave faces adjacent, the sections and the rim having interengaging means for limiting the movement of the sections toward each other, means in connection with the hub for forcing the central portions of the sections together, and interengaging means in connection with the sections and engaged by the movement of the sections toward each other for preventing angular movement of the sections with respect to each other.

HENRI DANIEL REY.